(12) United States Patent
Martinis et al.

(10) Patent No.: US 7,854,786 B2
(45) Date of Patent: Dec. 21, 2010

(54) REDUCTION PROCESS AND PLANT

(75) Inventors: Alessandro Martinis, Pozzuolo d.F (IT);
Andrea Tavano, Tavagnacco (IT);
Barbara Franco, Bagnaria Arsa (IT)

(73) Assignee: Danieli & C. Officine Meccaniche S.p.A., Buttrio (IT)

( * ) Notice: Subject to any disclaimer, the term of this patent is extended or adjusted under 35 U.S.C. 154(b) by 240 days.

(21) Appl. No.: 12/223,564

(22) PCT Filed: Jan. 30, 2007

(86) PCT No.: PCT/EP2007/050897
§ 371 (c)(1),
(2), (4) Date: Jul. 30, 2008

(87) PCT Pub. No.: WO2007/088166
PCT Pub. Date: Aug. 9, 2007

(65) Prior Publication Data
US 2009/0013828 A1  Jan. 15, 2009

(30) Foreign Application Priority Data
Jan. 31, 2006 (IT) .......................... MI2006A0158

(51) Int. Cl.
*C21B 13/02* (2006.01)
(52) U.S. Cl. ............................ 75/505; 431/5; 266/156; 266/157; 266/176; 266/197
(58) Field of Classification Search .................... 75/505; 266/156, 157, 176, 197; 431/5
See application file for complete search history.

(56) References Cited
U.S. PATENT DOCUMENTS

| | | | | |
|---|---|---|---|---|
| 4,889,323 A | * | 12/1989 | Pusch et al. .................. | 266/142 |
| 6,183,535 B1 | | 2/2001 | De-Gyves-De-la-Peña et al. | |
| 6,426,036 B1 | * | 7/2002 | Rabascall et al. ........... | 266/176 |
| 6,551,549 B2 | * | 4/2003 | Bueno et al. ................. | 266/156 |
| 2002/0030310 A1 | | 3/2002 | Rafael et al. | |

FOREIGN PATENT DOCUMENTS

| | | |
|---|---|---|
| CA | 2039940 A1 | 10/1991 |
| GB | 2 342 360 A | 4/2000 |
| WO | WO 96/00303 | 1/1996 |
| WO | WO 00/49184 | 8/2000 |
| WO | WO 2004/101829 A2 | 11/2004 |

OTHER PUBLICATIONS

Martinis et al. Obtaining Inert Direct Reduced Iron γ Means of the Danarex™ Process; *ABM* (2004) 1009-1018.

* cited by examiner

*Primary Examiner*—George Wyszomierski
*Assistant Examiner*—Tima M McGuthry-Banks
(74) *Attorney, Agent, or Firm*—Abelman, Frayne & Schwab

(57) ABSTRACT

Reduction process and relative plant for the production of metallic iron by means of the direct reduction of iron ore, in which a reduction shaft is connected to a source of reducing gas obtained from the gasification of coal. The process advantageously comprises a step in which a portion or all of the synthesis gas entering the plant circuit is processed to separate the methane from the rest of the components of said synthesis gas. The advantageous management of the extracted methane enables the entire reduction process to be optimized, making the efficiency of the process independent of the methane content in the original synthesis gas and making it possible to control the carbon content of the product more accurately and more easily.

17 Claims, 2 Drawing Sheets

REDUCTION PROCESS AND PLANT

FIELD OF THE INVENTION

The present invention relates to a reduction process and plant, suitable in particular for the production of metallic iron by means of the direct reduction of iron ore using the appropriately processed synthesis gas obtained from a gasifier as the reducing gas.

PRIOR ART

The product obtained as a result of a direct reduction process is known as DRI or "Direct Reduced Iron". The direct reduction process converts iron ore into a highly metallized iron product. The iron ore may be in the form of lump ore, pellets or a mixture of these components. The process produces reduced iron containing variable quantities of carbon preferably in the form of $Fe_3C$. This material is the ideal foodstock for electric arc furnaces used in the production of high-quality steel. Direct reduction systems can thus also be integrated with the systems upstream of electric steelmaking plants.

Methane reformers (using steam or iron reduction exhaust gases) are often used as the source of the reducing gas for this process. Coal or other fossil fuel gasifiers can also be used. A diagram of the layout of a plant and of a relative direct reduction process according to the prior art are illustrated in FIG. 1. The reducing gas is produced by a coal gasifier. The gas produced by a gasifier, known as synthesis gas or "syngas", can vary considerably according to the requirements of the end user.

In case of direct reduction, a suitable and non-limitative composition of the dry syngas is shown in the table below:

| | |
|---|---|
| $H_2/CO$ | 1-2.5 |
| $CO_2$ | max 3% |
| $CH_4$ | 5%-15% (preferably 12%-15%) |
| $N_2$ | max 2% |
| $C_2+$ | max 1% |
| $H_2S$ | max 100 ppm (vol.) |
| Other | traces |
| Temperature | min 30° C. |

The reactions occur in a shaft reactor in which there is a downflow of material, in the form of pellets or lumps, containing iron oxides, mainly hematite $Fe_2O_3$. There are detailed descriptions of the shaft reactor in the literature and for that reason it is not described here.

As the solid material moves down the reactor it meets a stream of reducing gas flowing in the opposite direction. The exhaust gas exits the reactor and flows along an exhaust gas line or duct. After being cleaned and cooled in a scrubber system, this exhaust gas is split into two flow paths. One stream is sent as fuel gas to the burners in the process heater, while the second stream, known as the recycle gas stream, is recirculated to increase system efficiency.

The gas streams used in direct reduction processes are often quantified on the basis of the ratio between the reducing and oxidizing agents, defined as:

$$\eta = (\% H_2 + \% CO)/(\% H_2O + \% CO_2).$$

This ratio indicates the capacity of the gas to reduce the oxides. In principle, the higher the ratio $\eta$ in the reducing gas entering the reactor the easier it is for the gas to reduce the iron oxides and the lower the specific quantity of gas that is required; the lower the $\eta$ value in the exhaust gas line, the more efficient the reduction process.

The exhaust gas contains significant levels of $H_2O$ and $CO_2$, which form during the reduction reaction, and has a ratio $\eta$ of approximately 1.4; it therefore still contains significant levels of reducing agents, which are recirculated in order to improve the overall efficiency of the process.

The cleaning and cooling performed by the scrubber also improve the exhaust gas, by condensing and thus eliminating the water produced by the reduction reactions. After cooling and cleaning in the scrubber, the recycled gas has a ratio $\eta$ of approximately 3.

The recycled gas is processed in the recirculation compressor and divided into two more flow paths or streams, one of which is further improved by being processed in an appropriate apparatus to remove the $CO_2$, using methods and techniques available on the market, to obtain a decarburized gas ($\eta > 15$).

At this stage the two additional streams respectively of recirculated process gas and decarburized gas are mixed with a stream of syngas supplied by an external source, usually a coal gasifier, the function of which is thus to reintegrate the reducing agents to the level required for the reduction process. The cold reducing gas obtained by mixing the three streams has a ratio $\eta$ of more than 10.

To supply the energy that is needed for the reduction reactions, the reducing gas is subjected to at least one heating process. A first heating process is performed in a process heater in which the gas is heated to a temperature of between 800° C. and 950° C. If necessary, a second heating process can be performed by injecting a certain amount of oxygen into the duct leading to the reactor in order to heat the gas to a temperature of between 850° C. and 1100° C. Though detrimental to the overall amount of reducing agents in the gas, raising the temperature in this way has a beneficial effect on reduction kinetics and improves the overall efficiency of the process.

Once it has been heated, the reducing gas is fed into the reactor where it reacts with the iron oxides in the load. The following reactions occur:

$$CO + 3Fe_2O_3 \rightarrow 2Fe_3O_4 + CO_2;$$

$$H_2 + 3Fe_2O_3 \rightarrow 2Fe_3O_4 + H_2O;$$

$$CO + Fe_3O_4 \rightarrow 3FeO + CO_2;$$

$$H_2 + Fe_3O_4 \rightarrow 3FeO + H_2O;$$

$$CO + FeO \rightarrow Fe + CO_2;$$

$$H_2 + FeO \rightarrow Fe + H_2O;$$

which can be grouped into the following overall reactions $$Fe_2O_3 + 3CO \rightarrow 2Fe + 3CO_2;$$

$$Fe_2O_3 + 3H_2 \rightarrow 2Fe + 3H_2O.$$

The reducing gas also contains a certain amount of methane, advantageously between 5 and 15%, which reacts with the $CO_2$ and $H_2O$, in the reaction zone of the reactor, helped by the previously reduced metallic iron that acts as a catalyst, giving rise to the following reforming reactions:

$$CH_4 + CO_2 \rightarrow 2CO + 2H_2;$$

$$CH_4 + H_2O \rightarrow CO + 3H_2.$$

The overall reaction that is obtained is: $CH_4+FeO \rightarrow Fe+CO+2H_2$.

Other parameters being equal, the amount of methane in the reducing gas fed into the reactor has a significant effect on the temperature of the load in the reaction zone of the reactor: both the overall reaction $CH_4+FeO \rightarrow Fe+CO+2H_2$ and the cracking reactions $CH_4 \rightarrow C+2H_2$ are endothermic reactions and cause a drop in the temperature in the reaction zone. Since the quality of the product and the reaction kinetics, and thus the productivity of the plant, depend on this temperature, and since the plants connected to gasifiers according to the prior art are not provided with means for controlling the amount of methane in the reducing gas that is fed into the reactor, the possibility of controlling the process in the reaction zone of the reactor is extremely limited. Furthermore, if the syngas that is used has a high methane content, this will result in excess methane in the reducing gas line entering the reactor with the consequence that the temperature in the reaction zone may be below that required for sufficient reduction of the oxide pellets.

A second drawback deriving from the fact that it is impossible to control the amount of methane in the reducing gas is the subsequently high levels of methane in the exhaust gas exiting the reactor. If the gas that is generally used as fuel has a high calorific value, there may be a surplus of gas that would necessarily be sent to the torch, with a subsequent reduction in overall process efficiency.

Another drawback regards the fact that it is not easy to control the carburization process in the carburization zone.

The reason why it is important to obtain a reduced iron product with a given carbon content is its subsequent use in the electric furnace (EAF) to produce steel. Carbon is used as a substitute for electrical energy, in order to reduce electricity consumption and, proportionally, wear on the electrodes, and as a source of CO to obtain a suitably foamed slag.

Furthermore, direct reduced iron (DRI) is highly reactive with oxygen and the humidity in the air and is subject to re-oxidation, which also results in the formation of potentially explosive mixtures. For this reason, DRI must only be stocked and transported after undergoing specific processes, namely passivation, to reduce its reactivity with air and water.

The product obtained using the plant illustrated in FIG. 1 has already been passivated and requires no further treatment. Passivation is due to a combination of several factors:

reduction occurs at a temperature of more than 800° C.; this process reduces the size of the pores in the DRI pellets which results in fewer active surfaces for oxidation and obstructs the diffusion of oxidizing molecules inside the DRI;

carbon is deposited on the surface of the DRI and binds with the metallic iron to cause carburization, i.e. the formation of iron carbide, for instance cementite ($Fe_3C$); the cementite produced in this way forms a thin layer on the surface of the DRI pellets, making the surfaces exposed to oxidation inactive.

Generally speaking, carburization is obtained by feeding a certain amount of reducing gas, containing methane, into the lower part of the reduction furnace, known as the carburization zone.

In the plant in FIG. 1 carburization is obtained by feeding into the carburization zone a portion of the reducing gas, subjected to at least one heating process, or syngas from the coal gasifier. The temperature and composition of the gas are such to produce numerous reactions in the carburization zone, including:

$2CO \rightarrow C+CO_2$ (Boudouard reaction or RC1);

$CO+H_2 \rightarrow C+H_2O$; (RC2 reaction)

$CH_4 \rightarrow C+2H_2$ (cracking reaction or RC3).

The carbon deposited on the DRI then binds with the metallic iron to form the cementite:

$C+3Fe \rightarrow Fe_3C$.

Reactions RC1 and RC2 are thermodynamically promoted by low temperatures and high pressures, while cracking is promoted by high temperatures and low pressures. When the conditions inside the carburization zone change, carbon is deposited on the DRI according to all the mechanisms described above.

However, the activation of these various mechanisms means it is not easy to control the carburization process, which complicates the optimization of the overall reduction process. Another drawback of the reduction processes known in the prior art is that a portion of the syngas entering the reduction plant is used as a cooling gas in the cooling vessel, which is arranged downstream of the carburization zone. Because the syngas has such a low specific heat, a large amount of gas must be made to flow through the cooling circuit upstream of the vessel in order to enable efficient cooling. The apparatus used to implement said cooling circuit, such as a compressor, a final cooler and a system to clean the gas leaving the vessel, must all therefore be large in size and also involve considerable investment costs.

A final drawback of the reduction systems known in the prior art that use synthesis gas produced by fossil fuel gasifiers, such as coal gasifiers, consists of the fact that the synthesis gas produced by such gasifiers is not always suitable for use as reducing gas in a direct reduction plant.

This gas can be made suitable for use in the direct reduction process by using, for example, gasifiers that use a shift reactor in which the gas is subjected to a water-gas shift reaction $CO+H_2O \rightarrow CO_2+H_2$ to obtain additional hydrogen as a reducing agent, or by using a methanization reactor to produce additional methane to increase the calorific properties of the gas. For all of these reasons it is not therefore possible to use a shaft reduction furnace with a standard gasifier, which makes the overall system more complex.

The need is therefore felt to produce a new reduction process and plant capable of overcoming the drawbacks described above.

SUMMARY OF THE INVENTION

A first purpose of the present invention is to produce a reduction process for the production of metallic iron that, by comprising a step in which a portion or all of the syngas entering the plant circuit is processed to separate the methane from the rest of the components, thus enabling better control of the process in the reduction reaction zone of the reactor, making the efficiency of the process independent of the methane content in the syngas, i.e. the quality of the syngas that is used.

Another purpose of the present invention is to implement a process that also allows the carburization phase to be controlled directly and completely in order to prevent the re-oxidation of the metallic iron.

A further purpose of the present invention is to use gas with a high calorific value in the cooling circuit of the reactor, thus reducing the amount of gas needed to cool the load and subsequently reducing the size of the apparatus needed by the circuit in order to process said cooling gas.

Another purpose of the present invention is to enable better exploitation of the $CH_4$ and thus improve process efficiency. Furthermore, this process provides more favourable conditions for the gas primary heater. The lower $CH_4$ content in the gas entering the heater reduces the risk of degradation due to methane cracking.

A final purpose of the present invention is to produce a direct reduction plant capable of performing the aforesaid process.

The present invention achieves the purposes described above with a process for the direct reduction of iron ore performed by a plant comprising a gravitational furnace having at least one iron ore reduction zone in the upper part thereof, and at least one carbon deposition zone and one reduced metal product cooling zone in the lower part thereof, iron ore feeding means, iron ore moving means for moving ore inside the furnace, means for discharging the reduced metal product, means for feeding a reducing gas mixture into at least one section of the reactor in correspondence with the reduction zone, means for processing exhaust gas and powders, comprising the following steps:

a) extraction of the exhaust gas from the reactor using extraction means, b) cleaning and cooling of the exhaust gas in a first cleaning system, to eliminate the water produced by the reduction reactions, c) division of said exhaust gas into first and second flow paths, d) sending of the first stream as fuel gas to burners in heating means, e) recirculation of the second stream to improve the ratio ($\eta$) between the reducing gas and oxidizing gas content thereof, comprising the steps of f) processing the second stream in a recirculation compressor, g) dividing the second stream into third and fourth recirculating gas streams, and h) removing the $CO_2$ from the third recirculating gas stream in order to increase said ratio ($\eta$), by means of $CO_2$ removal means, i) mixing said third and fourth streams in mixing means with a synthesis gas supplied by an external source in order to re-integrate the amount of reducing gas needed to reduce the iron ore, to define a reducing gas mixture, j) heating of the reducing gas mixture in the heating means to a temperature of between 800° C. and 950° C., k) feeding of the reducing gas mixture leaving the heating means into the reduction zone of the reactor, through feeding means, characterized in that l) at stage i) at least a portion of the synthesis gas stream supplied by the external source is made to pass through a processing device to separate pure methane from the synthesis gas, forming a fifth stream of pure methane and a sixth stream of reducing gas, comprising the CO and $H_2$ reducing gases, m) said sixth stream is mixed with said reducing gas mixture by means of said mixing means, n) a portion of said fifth stream of pure methane is fed into the carbon deposition zone, a portion into the cooling zone, a portion into the feeding means leading into the reactor reduction zone and a portion into the burners of the heater.

The process according to the present invention is advantageously performed by a plant for the direct reduction of iron ore suitable for implementing a reduction process of the type described above, comprising a gravitational furnace having at least one iron ore reduction zone in the upper part thereof, and at least one carbon deposition zone and one reduced metal product cooling zone in the lower part thereof, iron ore feeding means, moving means for moving ore inside the furnace itself, means for discharging the reduced metal product, means for feeding a reducing gas mixture into at least one section of the reactor in correspondence with the reduction zone, means for processing exhaust gas and powders said plant being characterized in that it comprises
    a processing device for separating pure methane from at least a portion of a synthesis gas stream supplied by an external source so as to form a stream of pure methane and a stream of reducing gas, comprising CO and $H_2$,
    a duct to carry the reducing gas stream coming from the processing device (16) to mixing means, to be mixed with a reducing gas mixture, deriving from a mixture of the exhaust gas processed with part of the synthesis gas,
    a duct to carry the pure methane to four points of the plant, said four points comprising a duct leading into the feeding means into the reactor reduction zone, a duct leading into the carbon deposition zone, a duct leading into the cooling zone and a duct leading into burners of heating means.

Advantageously, separating the syngas entering the plant into a stream of pure methane and a stream consisting of reducing agents such as CO and $H_2$ makes it possible to:
    send the stream of reducing gas to the cold reducing gas line, upstream of a first heating process, thus improving the reducing value of said gas,
    and to control, using the appropriate adjusting means, such as valves, the amount of methane in the reducing gas that is to be fed into the reaction zone of the reactor by adding a predetermined amount of pure methane downstream of said first heating process, protecting the heater against the risk of degradation due to excessive methane levels.

By controlling the exact amount of methane in the reducing gas, it is also possible to directly control the amount of methane in the reaction zone in order to improve the quality of the product, optimize reaction kinetics and thus plant productivity.

A second advantage of the process according to the invention consists of the fact that this new process makes it easier to control the carburization process. By feeding pure methane only into the carburization zone the only reaction that takes place inside said zone is cracking which, besides producing two volumes of reducing gas per volume of reacted methane, is an endothermic reaction and helps to control the temperature of the load.

The use of $CH_4$ as a carburization vector helps to reduce the $CH_4$ content in the recycled gas, preventing an excessive build-up thereof.

Another advantage consists of the fact that the pure methane can also be used separately as a cooling gas. Since pure methane has a higher specific heat than the other syngas components, it is possible to reduce the amount of gas flowing in the cooling circuit. The cooling circuit can therefore comprise smaller apparatus, involving lower investment costs.

The claims attached hereto describe preferred embodiments of the invention.

BRIEF DESCRIPTION OF DRAWINGS

Further characteristics and advantages of this invention will become clear from the following detailed description of a preferred, but not exclusive embodiment of a reduction plant, that is merely illustrative and not limitative, with the help of the drawings attached hereto, in which.

DETAILED DESCRIPTION OF PREFERRED EMBODIMENTS OF THE INVENTION

Figure 1:
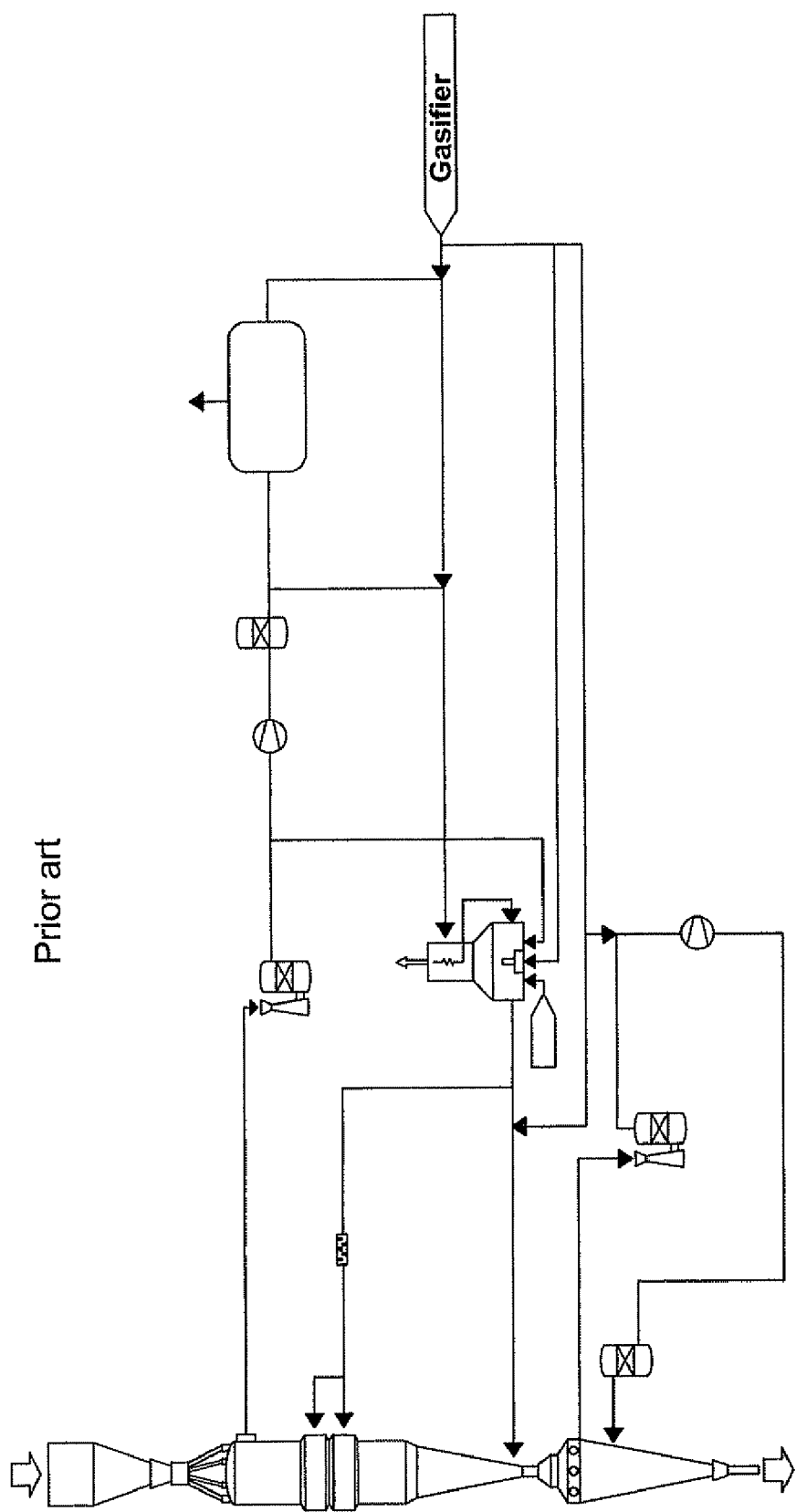
FIG. 1 is a diagram of a layout of a plant according to the prior art.
Figure 2:
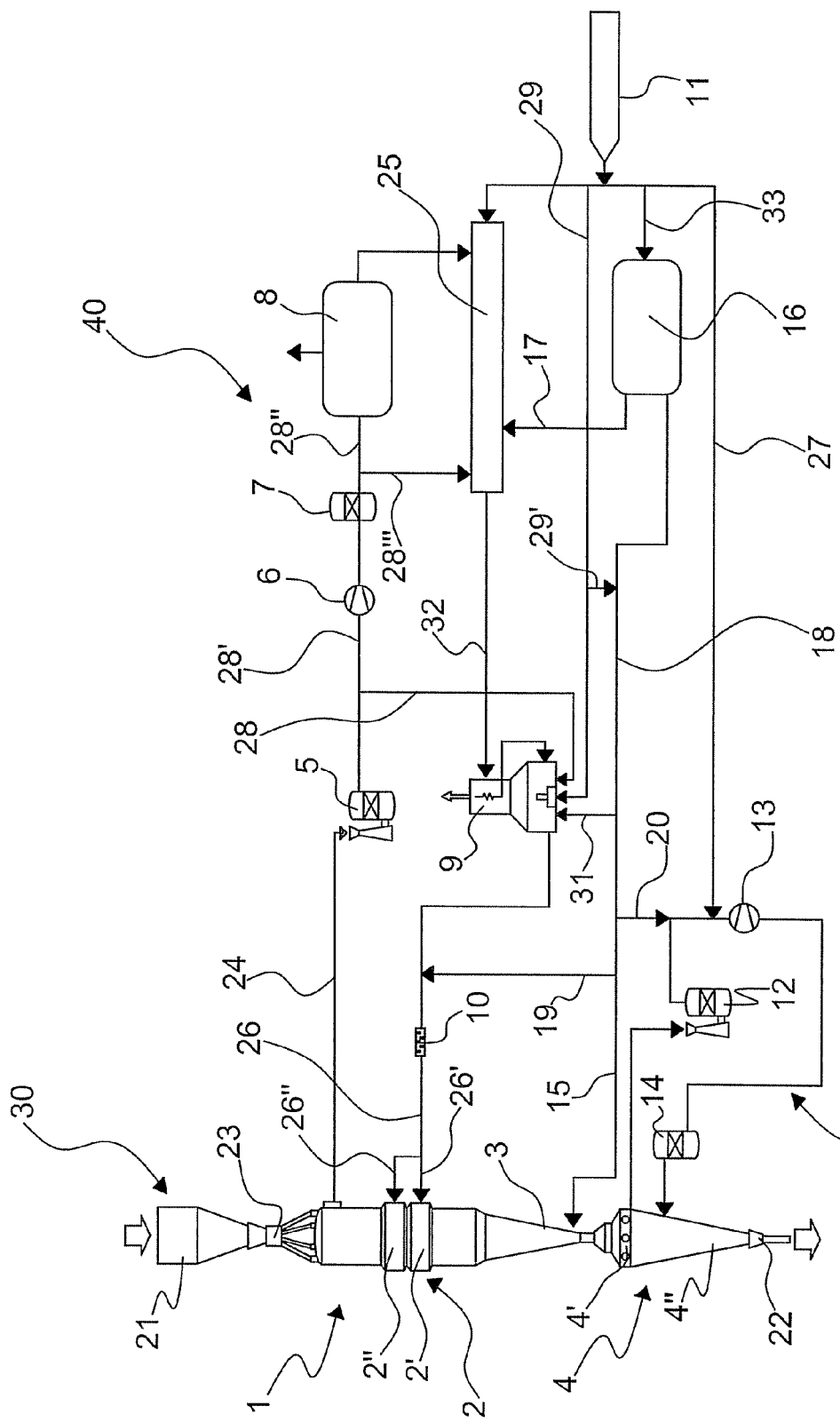
FIG. 2 is a diagram of a layout of a plant according to the present invention.

With reference to FIG. 2 a layout of a reduction plant suitable for performing the process according to the present invention is illustrated.

Said plant provides for the connection by means of a plant circuit, indicated as a whole by the number 40, of a reduction shaft 30 with an external source 11 supplying synthesis gas, otherwise known as syngas, which is used as the reducing gas and produced for instance by a coal gasifier.

The reduction shaft 30 comprises from top to bottom:
an iron ore feeding zone 21,
a reactor or shaft 1 for the direct reduction of the minerals,
a carburization zone 3,
a cooling vessel 4.

The reactor or shaft 1 produces hot metallic iron or DRI, from oxides in the form of pellets and/or lumps, that descends due to the effects of gravity into the carburization zone 3. The cooling vessel 4 downstream is in turn directly connected to a discharging device by means of a dynamic gas seal leg 22. A second dynamic gas seal leg 23 is arranged between the feeding zone 21 and the reactor 1. There is thus a single flow of material from the hopper feed of the reduction shaft 30 to the base of the shaft or column.

As the solid material flows down through the reactor 1 it meets a stream of reducing gas flowing in the opposite direction that is fed into the reaction zone 2 of said reactor, said zone being substantially cylindrical in shape.

According to the preferred embodiment in FIG. 2 the reaction zone 2 comprises two reduction and reforming zones 2', 2", into which two streams of the reducing gas are fed so as to improve the distribution and supply of heat energy in said reaction zone 2. The stream of reducing gas is actually split into two parts and distributed between two ducts 26', 26" provided with their respective upper and lower feeders. The reducing gas stream or mixture is preferably divided between the upper and lower feeders in a proportion of approximately 30/70, with a greater proportion being sent to the lower feeder. Said division is performed by the respective adjusting means, such as suitably sized valves or nozzles. Other embodiments characterized by a number of feeders and relative ducts other than two are also possible.

The exhaust gas is extracted from the reactor by means of the relative extraction means and flows along an exhaust gas line or duct 24. After being cleaned and cooled in a cleaning system 5, otherwise known as a scrubber, to eliminate the water produced by the reduction reactions, this exhaust gas is split into two flow paths. One stream is sent as fuel gas to the burners of the heater 9 along the duct 28; the second stream is recirculated to increase the ratio η between the reducing and oxidizing agents and is called the recycled gas stream 28'. The recirculating or recycled gas is processed in the recirculation compressor 6 and in a cooler 7, if said cooler is provided, and is then split into two more flow paths or streams 28" and 28''', the ratio η of the stream 28" is further increased to between 15 and 35 by processing it in a suitable apparatus 8 to remove the $CO_2$, in order to obtain a decarburized recirculating gas stream.

These decarburized and non-decarburized recirculated gas streams 28''' are then mixed in the mixing duct 25 with a stream of syngas supplied by the external source 11 in order to re-integrate the quantity of reducing agents required by the reduction process. The cold reducing gas obtained by mixing the three streams described above that flows through the duct 32 has a ratio η of more than 10.

To supply the amount of energy required by the reduction reactions, the cold reducing gas in the mixing duct 25 is subjected to at least one heating process when it reaches the burners of the heater 9, in which the temperature of the gas is heated to between 800° C. and 950° C., preferably to more than 920° C. The hot reducing gas leaving the heater 9 flows through a duct 26 leading into the reaction zone 2 of the reactor 1.

Advantageously at least a portion of the syngas supplied by the external source 11 flows through another duct 33 provided with a processing device 16 suitable for separating the methane, the content of which in the syngas is between approximately 5% and 15%, from the rest of the gaseous flow. Said device 16 consists, for instance, of a cryogenic circuit. At the output of said processing device two new flow paths or streams are obtained: a stream of pure methane that flows through the duct 18, and a stream of pure reducing gas, comprising the reducing agents CO and $H_2$, which flows through a duct 17 leading into the mixing duct 25. Alternatively the processing device may consist of a circuit based on the use of physical separating means, such as membranes or molecule sieves, or chemical absorption systems.

The pure methane flowing through the duct 18 is advantageously used in four different points of the circuit 40.

A first predetermined portion of the pure methane is diverted along a line or duct 19 leading into the duct 26. The plant is advantageously provided with first adjusting means, not illustrated in the drawing, for controlling the amount of pure methane that is fed into the reducing gas duct 26 so as to optimize the reduction and reforming reactions.

By controlling the methane content in the reducing gas entering the reactor 1 it is possible to directly control the reduction process in the reaction zone 2 of the reactor, by appropriately adjusting the temperature of the load in the reaction zone, preferably to between 800 and 900° C., and thus the reaction kinetics. The total amount of methane in the line or duct 26 is thus controlled and maintained constant, regardless of the composition of the syngas that is used.

A second heating process may be provided, downstream of the point at which the methane is fed into the duct 26, by injecting a predetermined amount of pure oxygen or oxygen-enriched air into said duct 26 so as to produce a partial combustion of CO and $H_2$ and heat the reducing gas to be introduced to a temperature of between 850° C. and 1100° C.

After undergoing the additional heating process, the reducing gas stream is fed into the ducts 26', 26" and then into the zone 2' and zone 2" for reduction and reforming.

Though detrimental to the overall number of reducing agents in the gas, raising the temperature by means of said second heating process has a beneficial effect on reaction kinetics and improves the overall efficiency of the process. At this point the heated reducing gas comprising a predetermined percentage of pure methane is fed into the reactor where it reacts with the iron oxides in the load to be reduced.

A second predetermined portion of the pure methane is fed into the carburization zone 3 via the duct 15 and constitutes the only carburizing gas. Advantageously this makes it possible to control the carburization process directly and completely: carbon is only deposited in the carburization zone 3 due to methane cracking, which prevents the triggering of other more complex reaction processes that are detrimental to the η of the gas, and the amount of carbon in the end metal product, preferably between 1.5% and 4%, can be controlled directly, simply by adjusting the carburizing gas flow rate using the relative second adjusting means. The reduced metallic iron, with a thin layer of iron carbide on the surface, leaves the carburization zone 3 while it is still hot, at a temperature of between approximately 500 and 650° C. The material remains in the zone 3 for a period of approximately 1-2 hours, advantageously 1.5 hours; the outflow of material from the zone 3 is controlled by connecting means with the cooling vessel 4, not illustrated in FIG. 2, which comprise for example a valve for solids or a straightforward duct. In case of the valve for solids, this also has the function of preventing the cooling gas used in the vessel 4 from reaching the carburization zone 3 and the reaction zone 2, advantageously separating the reaction zones from the cooling zone, and of preventing the metal product below from having to support an excessively high column of material.

A third predetermined portion of the pure methane is diverted from the duct 18 into the line or duct 20 leading into a cooling circuit 20' supplying the cone-shaped zone 4" of the cooling vessel 4.

Feeding pure methane into said circuit 20' at a rate controlled by appropriate third adjusting means, advantageously makes it possible to reduce the amount of gas flowing through said cooling circuit. The methane has a higher specific heat than the other components of the synthesis gas supplied by the external source 11 to the cooling circuit 20' via a duct 27. Increasing the amount of methane, even by as much as 100%, in the gas flowing through the circuit 20' reduces the amount of gas that must flow through the circuit to achieve optimum cooling. Thus introducing pure methane into the cooling circuit 20' advantageously makes it possible to implement a circuit in which the apparatus arranged along the return line from the cooling vessel 4, for instance a compressor 13, an aftercooler 14 and a scrubber 12, are smaller than those used by conventional systems. The gas leaving the cooling circuit 20' enters the vessel 4 via a device, which is not illustrated, located in the cone-shaped zone 4", capable of radially distributing the gas so that it comes into contact with the material to be cooled. Said third adjusting means control the supply of pure methane into the circuit 20' so that the gas entering the vessel 4 is preferably at a temperature of between 35 and 50° C. The metal product thus cooled and passivated is then discharged by means of a discharging device, consisting for example of a vibrating conveyor. Said discharging device is synchronized with the valve for solids so that the amount of material inside the cooling vessel 4 remains substantially constant. If the connecting means comprise a simple duct, the rate of material flowing from the carburization zone 3 to the vessel 4 is controlled directly by the discharging device downstream.

Another advantage of the process and plant according to the invention consists of the fact that the introduction into the mixing duct 25 of pure reducing gas, comprising the reducing agents CO and $H_2$ and containing no methane, also results in a reduction in the amount of carbon that is deposited due to cracking in the heater 9. The deposition of carbon in the heater pipes depends on how the following reactions are balanced:

$2CO \rightarrow C+CO_2$ (Boudouard reaction or RC1);

$CO+H_2 \rightarrow C+H_2O$; (RC2 reaction)

$CH_4 \rightarrow C+2H_2$ (cracking reaction or RC3), and methane cracking is particularly promoted within the temperature range of between 400 and 950° C. (the operating range of the heater). Thus, advantageously, the reduced level of methane in the cold reducing gas entering the heater reduces the possibility of cracking during the heating process and thus the deposition of carbon with the consequence that the heater's service life is extended. Advantageously specific amounts of synthesis gas can be sent along the duct 29 to the burners of the heater 9 and, if useful for the process, the pure methane flowing through the duct 18 can be mixed with predetermined amounts of synthesis gas via the branch line 29' of said duct 29. Finally, a stream of pure methane taken from the duct 18 can be sent directly to the burners of the heater 9 via the duct 31, if the methane produced by the processing device or separator 16 exceeds the amount required by the process. Means for controlling the flow rate of the pure methane sent directly to the burners are provided.

The process and plant according to the invention therefore allow complete control of the main reduction process parameters, such as for instance temperature and the ratio η, in the various zones of the plant thus making the process more stable. The arrangement of the plant in FIG. 2, in which the methane can be extracted from the inflowing syngas, also means that process efficiency is independent of the methane content in said syngas. Furthermore, said plant does not require additional external sources of pure methane with the relative feed inlets to be provided in the circuit. Another advantage consists of the fact that the gasifier connected to the plant according to the invention need no longer be provided with components that are not directly linked to the production of the actual synthesis gas. The methane extracted from the syngas may be used as described above, but it may also be stored or sent to other users. The specific embodiments described in this document are not limitative and this patent application covers all the alternative embodiments of the invention as set forth in the claims.

The invention claimed is:

1. Process for the direct reduction of iron ore performed by means of a plant comprising a gravitational furnace having at least one iron ore reduction zone in the upper part thereof, and at least one carbon deposition zone and one reduced metal product cooling zone in the lower part thereof, iron ore feeding means, means for discharging the reduced metal product, means for feeding a reducing gas mixture into at least one section of a reactor in correspondence with the reduction zone, means for processing exhaust gas and powders comprising the following steps:
   a) extraction of the exhaust gas from the reactor using extraction means,
   b) cleaning and cooling of the exhaust gas in a first cleaning system, to eliminate water produced by reduction reactions,
   c) division of said exhaust gas into first and second streams,
   d) sending of the first stream as fuel gas to burners in heating means,
   e) recirculation of the second stream to improve the ratio (η) between reducing gas and oxidizing gas contained therein, comprising the steps of
   f) processing the second stream in a recirculation compressor, g) dividing the second stream into third and fourth recirculating gas streams, and
h) removing $CO_2$ from the third recirculating gas stream in order to increase said ratio ($\eta$), by means of $CO_2$ removal means,
i) mixing said third and fourth streams in said mixing means with a synthesis gas stream supplied by an external source in order to re-integrate the amount of reducing gas needed to reduce the iron ore, to form a reducing gas mixture,
j) heating of the reducing gas mixture in the heating means to a temperature of between 800° C. and 950° C.,
k) feeding of the reducing gas mixture leaving the heating means into the reduction zone of the reactor, through feeding means,
characterized in that
l) at stage i) at least a portion of the synthesis gas stream supplied by the external source is made to pass through a processing device to separate pure methane from the synthesis gas, forming a fifth stream of pure methane and a sixth stream of reducing gas, comprising the CO and $H_2$ reducing gases,
m) said sixth stream is mixed with said reducing gas mixture by means of said mixing means,
n) a portion of said fifth stream of pure methane is fed into the carbon deposition zone, a portion into the cooling zone, a portion into the feeding means leading into the reduction zone and a portion into the burners of the heating means.

2. Process according to claim 1, wherein at step f) the second stream is processed in a cooler.

3. Process according to claim 2, wherein said reducing gas mixture obtained by mixing the synthesis gas stream with said third, fourth and sixth streams has a ratio ($\eta$) greater than 12.

4. Process according to claim 3, wherein the reducing gas mixture is preferably heated to above 910° C.

5. Process according to claim 4, wherein downstream of step j) there is at least one additional reducing gas mixture heating process.

6. Process according to claim 5, wherein said additional heating process is implemented by injecting a predetermined amount of oxygen and/or air into the feeding means to bring the temperature of the reducing gas mixture to between 850° C. and 1100° C.

7. Process according to claim 6, wherein the portion of the fifth stream of pure methane that is fed into the cooling zone of the reactor is first cooled in a cooling circuit that supplies said cooling zone.

8. Process according to claim 1, wherein the amount of carbon in the reduced metal product is controlled directly by adjusting the flow rate of the portion of the fifth stream to be fed into the carbon deposition zone by means of respective adjusting means and by controlling its calorific value by means of a synthesis gas stream from a duct.

9. Process according to claim 7, wherein the flow rate of the portion of the fifth stream to be fed into the cooling circuit is controlled by means of respective adjusting means in order to maintain said portion of the stream at a temperature of between 35 and 50° C. at the entrance to the cooling zone.

10. Process according to claim 1, wherein the flow rate of the portion of the fifth stream to be fed into the feeding means is controlled by means of respective adjusting means in order to optimize the reduction reactions and reforming reactions.

11. Plant for the direct reduction of iron ore, suitable for implementing a reduction process according to claim 1, comprising a gravitational furnace having at least one iron ore reduction zone in the upper part thereof, and at least one carbon deposition zone and one reduced metal product cooling zone in the lower part thereof, iron ore feeding means, means for discharging the reduced metal product, means for feeding a reducing gas mixture into at least one section of a reactor in correspondence with the reduction zone, means for processing exhaust gas and powders, said plant being characterized in that it comprises
   a processing device for separating pure methane from at least a portion of a synthesis gas stream supplied by an external source in order to form a stream of pure methane and a stream of reducing gas, comprising CO and $H_2$,
   a duct to carry the reducing gas stream to mixing means coming from the processing device, to be mixed with a reducing gas mixture, deriving from an exhaust gas mixture processed with part of the synthesis gas,
   a duct to carry the pure methane stream to four points of the plant, said four points comprising a duct leading into the feeding means into the reactor reduction zone, a duct leading into the carbon deposition zone, a duct leading into the cooling zone and a duct leading into burners of heating means.

12. Plant according to claim 11, wherein said processing device consists of a cryogenic circuit or of a circuit based on the use of physical separating means, such as membranes or molecule sieves, or chemical absorption systems.

13. Plant according to claim 12, wherein between said cooling zone and said feeding duct there is a cooling circuit comprising a compressor, a cooler and a second cleaning system arranged along a return line from the cooling zone.

14. Plant according to claim 13, wherein said feeding means comprise a duct for feeding said reducing gas mixture into the reduction zone.

15. Plant according to claim 13, wherein said mixing means consist of a mixing duct.

16. Plant according to claim 14, wherein between a first cleaning system and said means for removing $CO_2$ there is a compressor for recirculating a portion of the exhaust gas and possibly a second cooler.

17. Plant according to claim 16, provided with the respective means for adjusting a pure methane flow rate respectively in the duct leading into the feeding duct, in the duct leading into the carbon deposition zone, in the duct leading into the cooling circuit and in the duct leading into the burners of the heater.

* * * * *